United States Patent
Quinn et al.

(10) Patent No.: US 7,255,475 B2
(45) Date of Patent: Aug. 14, 2007

(54) THERMOMETRY PROBE CALIBRATION METHOD

(75) Inventors: David E. Quinn, Weedsport, NY (US); Kenneth J. Burdick, Skaneateles, NY (US); Ray D. Stone, San Diego, CA (US); John Lane, Weedsport, NY (US); William N. Cuipylo, Auburn, NY (US)

(73) Assignee: Welch Allyn, Inc., Skaneateles Falls, NY (US)

( * ) Notice: Subject to any disclaimer, the term of this patent is extended or adjusted under 35 U.S.C. 154(b) by 0 days.

(21) Appl. No.: 11/248,492

(22) Filed: Oct. 12, 2005

(65) Prior Publication Data

US 2006/0072645 A1    Apr. 6, 2006

Related U.S. Application Data

(60) Division of application No. 10/683,206, filed on Oct. 10, 2003, now Pat. No. 6,971,790, which is a continuation-in-part of application No. 10/269,461, filed on Oct. 11, 2002, now abandoned.

(51) Int. Cl.
  *G01K 15/00*  (2006.01)
  *G01K 19/00*  (2006.01)
  *G01K 7/00*   (2006.01)
  *A61B 5/01*   (2006.01)

(52) U.S. Cl. .................. 374/163; 374/1; 374/172; 702/99; 600/549

(58) Field of Classification Search ............. 374/121, 374/120, 163, 183; 600/474, 549; 702/139, 702/99
See application file for complete search history.

(56) References Cited

U.S. PATENT DOCUMENTS

| | | | |
|---|---|---|---|
| 3,491,596 A | 1/1970 | Dean | |
| 3,592,059 A | 7/1971 | Chilton | |
| 3,681,991 A | 8/1972 | Eberly, Jr. | |
| 3,729,998 A | 5/1973 | Mueller et al. | |
| 3,791,214 A | 2/1974 | Keith | |
| 3,832,669 A | 8/1974 | Mueller et al. | |
| 3,832,726 A * | 8/1974 | Finelli | 396/350 |
| 3,832,902 A | 9/1974 | Usami et al. | |
| 3,878,724 A * | 4/1975 | Allen | 374/169 |
| 3,893,058 A | 7/1975 | Keith | |
| 3,915,003 A | 10/1975 | Adams | |
| 4,158,965 A | 6/1979 | Prosky | |
| 4,183,248 A | 1/1980 | West | |

(Continued)

FOREIGN PATENT DOCUMENTS

GB    2 140 923 A    12/1984

(Continued)

OTHER PUBLICATIONS

The Dynamic Thermometer: An Instrument For Fast Measurements With Platinum Resistance Thermometers: Transactions of the Institute of Measurement and Control; vol. 15, No. 1; 1993; 4 pages (pp. 11-18).

*Primary Examiner*—Gail Verbitsky
(74) *Attorney, Agent, or Firm*—Marjama & Bilinski LLP (57) ABSTRACT

A method in which thermal mass and manufacturing differences are compensated for in thermometry probes by storing characteristic data relating to individual probes into an EEPROM for each probe which is used by the temperature apparatus.

4 Claims, 6 Drawing Sheets

U.S. PATENT DOCUMENTS

| | | | |
|---|---|---|---|
| 4,204,429 A | 5/1980 | Shimazaki et al. | |
| 4,210,024 A | 7/1980 | Ishiwatari et al. | |
| 4,411,535 A | 10/1983 | Schwarzschild | |
| 4,464,725 A | 8/1984 | Briefer | |
| 4,466,749 A | 8/1984 | Cunningham et al. | |
| 4,475,823 A | 10/1984 | Stone | |
| 4,480,312 A | 10/1984 | Wingate | |
| 4,487,208 A | 12/1984 | Kamens | |
| 4,688,949 A | 8/1987 | Hatakenaka | |
| 4,713,783 A | 12/1987 | Fletcher | |
| H562 H | 12/1988 | Trachier et al. | |
| 4,790,324 A | 12/1988 | O'Hara et al. | |
| 4,901,257 A | 2/1990 | Chang et al. | |
| 4,932,789 A | 6/1990 | Egawa et al. | |
| RE34,507 E | 1/1994 | Egawa et al. | |
| 5,293,877 A | 3/1994 | O'Hara | |
| 5,463,375 A | 10/1995 | Bauer | |
| 5,542,285 A * | 8/1996 | Merilainen et al. | 73/23.21 |
| 5,720,293 A | 2/1998 | Quinn et al. | |
| 5,735,605 A | 4/1998 | Blalock | |
| 5,857,777 A * | 1/1999 | Schuh | 374/172 |
| 5,967,992 A | 10/1999 | Canfield | |
| 6,000,846 A | 12/1999 | Gregory et al. | |
| 6,036,361 A | 3/2000 | Gregory et al. | |
| 6,109,784 A | 8/2000 | Weiss | |
| 6,146,015 A | 11/2000 | Weiss | |
| 6,188,971 B1 | 2/2001 | Kelly | |
| 6,250,802 B1 | 6/2001 | Dotan | |
| 6,280,397 B1 | 8/2001 | Yarden et al. | |
| 6,304,827 B1 | 10/2001 | Blixhavn et al. | |
| 6,355,916 B1 | 3/2002 | Siefert | |
| 6,374,191 B1 | 4/2002 | Tsuchiya et al. | |
| 6,454,931 B2 * | 9/2002 | Patrick et al. | 205/781 |
| 6,485,433 B1 * | 11/2002 | Peng | 600/549 |
| 6,634,789 B2 | 10/2003 | Babkes | |
| 6,698,921 B2 * | 3/2004 | Siefert | 374/169 |
| 2005/0018749 A1 * | 1/2005 | Sato et al. | 374/121 |
| 2005/0069925 A1 * | 3/2005 | Ford et al. | 435/6 |

FOREIGN PATENT DOCUMENTS

| | | |
|---|---|---|
| JP | 54025882 | 2/1979 |
| JP | 59184829 | 10/1984 |
| JP | 61296224 | 12/1986 |
| JP | 61296225 | 12/1986 |
| JP | 61296226 | 12/1986 |
| JP | 62069128 | 3/1987 |
| JP | 01189526 | 7/1989 |
| WO | 92/03705 | 3/1992 |

* cited by examiner

THERMOMETRY PROBE CALIBRATION METHOD

CROSS REFERENCE TO RELATED APPLICATIONS

This application is a divisional patent of U.S. patent application Ser. No. 10/683,206, filed Oct. 10, 2003, now U.S. Pat. No. 6,971,790 which is a continuation-in-part application of U.S. Ser. No. 10/269,461, now abandoned, filed Oct. 11, 2002, the entire contents of each being incorporated by reference.

FIELD OF THE INVENTION

This invention relates to the field of thermometry, and more particularly to a method of calibrating temperature measuring probes for use in a related apparatus.

BACKGROUND OF THE INVENTION

Temperature sensors in thermometric devices, such as patient thermometers, have typically been ground to a certain component calibration which will affect the ultimate accuracy of the device. These components are then typically assembled into precision thermometer probe assemblies.

In past improvements, static temperature measurements or "offset type coefficients" have been stored into the thermometer's memory so that they can be either added or subtracted before a reading is displayed by a thermometry system, thereby increasing accuracy of the system. This is described, for example, in products such as those manufactured by Thermometrics and as described, for example, in U.S. Patent Publication No. 2003/0002562 to Yerlikaya et al.

A problem with the above approach is that most users of thermometry systems cannot wait the full amount of time for thermal equilibrium, which is typically where the offset parameters are taken.

Predictive thermometers look at a relatively small rise time (e.g., approximately 4 seconds) and thermal equilibrium is typically achieved in 2-3 minutes. A prediction of temperature, as opposed to an actual temperature reading, can be made based upon this data.

A fundamental problem with current thermometry systems is the lack of accounting for variations in probe construction/manufacturing that would affect the quality of the early rise time data. A number of manufacturing specific factors, for example, the mass of the ground thermistor, amounts of bonding adhesives/epoxy, thicknesses of the individual probe layers, etc. will significantly affect the rate of temperature change that is being sensed by the apparatus. To date, there has been no technique utilized in a predictive thermometer apparatus for normalizing these types of effects.

Another effect relating to certain forms of thermometers includes pre-heating the heating element of the thermometer probe prior to placement of the probe at the target site. Such thermometers, for example, as described in U.S. Pat. No. 6,000,846 to Gregory et al., the entire contents of which is herein incorporated by reference, allow faster readings to be made by permitting the heating element of a medical thermometer to be raised in proximity (within about 10 degrees or less) of the body site. The above manufacturing effects also affect the preheating and other characteristics on an individual probe basis. Therefore, another general need exists in the field to also normalize these effects for preheating purposes.

SUMMARY OF THE INVENTION

It is a primary object of the present invention to attempt to alleviate the above-described problems of the prior art.

It is another primary object of the present invention to normalize the individual effects of different temperature probes for a thermometry apparatus.

Therefore and according to a preferred aspect of the present invention, there is disclosed a method for calibrating a temperature probe for a thermometry apparatus, said method including the steps of:

characterizing the transient heat rise behavior of a said temperature probe; and storing characteristic data into memory associated with each said probe.

Preferably, the stored characteristic data can then be used in an algorithm(s) in order to refine the predictions from a particular temperature probe.

According to another preferred aspect of the present invention, there is disclosed a method for calibrating a temperature probe for a thermometry apparatus, said method comprising the steps of:

characterizing the preheating characteristics of a temperature probe; and storing said characteristic data into memory associated with each probe.

Preferably, the storage memory consists of an EEPROM that is built into the thermometer probe, preferably as pat of a connector, onto which the algorithms and characteristic probe-specific data can be stored.

Preferably according to at least one aspect of the invention, the characteristic data which is derived is compared to that of a "nominal" temperature probe. Based on this comparison, adjusted probe specific coefficients can be stored into the memory of the EEPROM for use in at least one algorithm (e.g., polynomial) used by the processing circuitry of the apparatus.

An advantage of the present invention is that the manufacturing effects of various temperature probes can be easily normalized for a thermometry apparatus.

Another advantage is that manufacturability or manufacturing specific differences of a probe can be minimized or normalized when in use, providing significant savings in cost and time.

These and other objects, features and advantages will become readily apparent from the following Detailed Description which should be read in conjunction with the accompanying drawings.

DETAILED DESCRIPTION

The following description relates to the calibration of a particular medical thermometry apparatus. It will be readily apparent that the inventive concepts described herein are applicable to other thermometry systems and therefore this discussion should not be regarded as so limiting.

Figure 1:
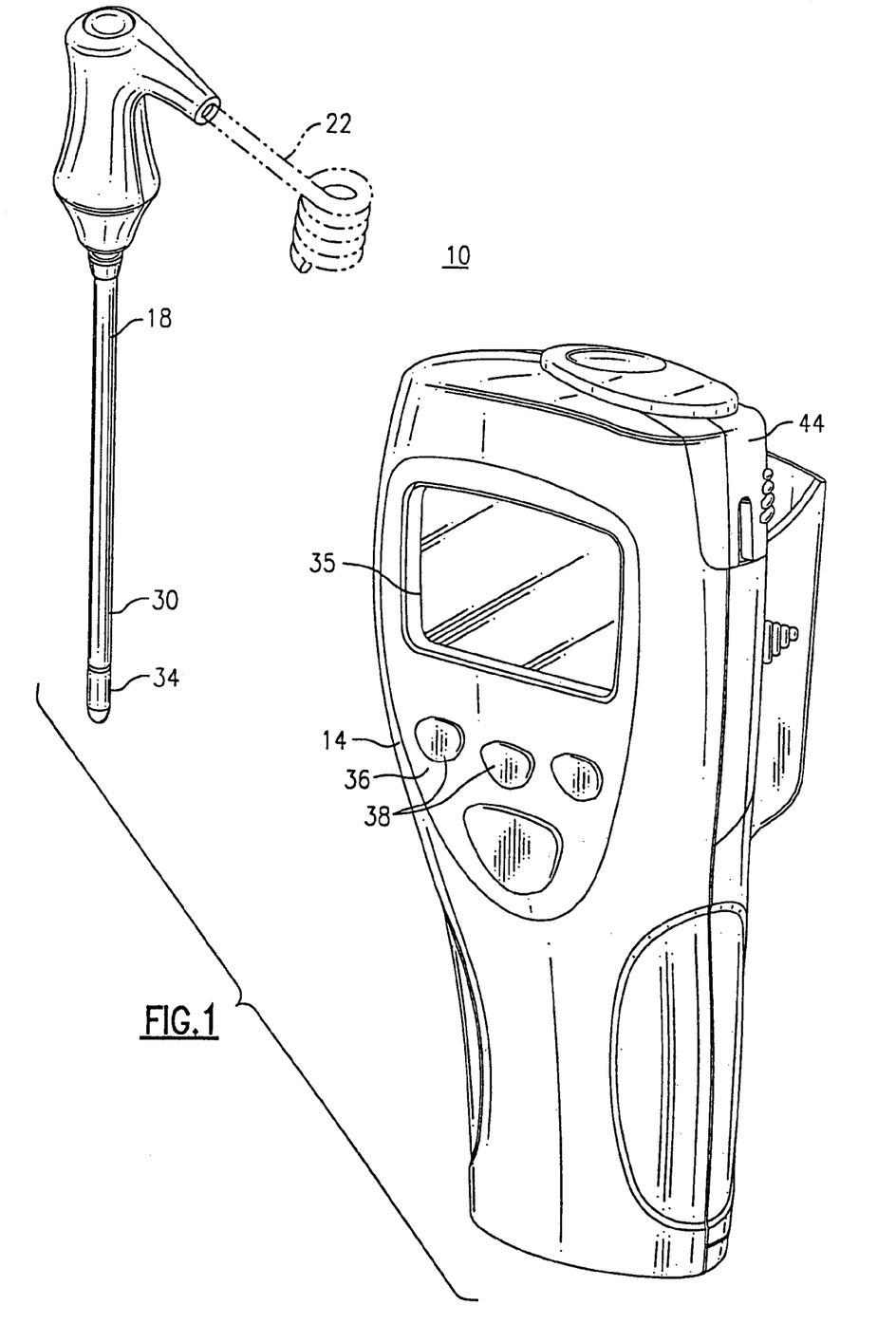
FIG. 1 is a top perspective view of a temperature measuring apparatus used in accordance with the method of the present invention.

Referring first to FIG. 1, there is shown a temperature measuring apparatus 10 that includes a compact housing 14 and a temperature probe 18 that is tethered to the housing by means of a flexible electrical cord 22, shown only partially and in phantom in FIG. 1. The housing 14 includes a user interface 36 that includes a display 35, as well as a plurality of actuable buttons 38 for controlling the operation of the apparatus 10. The apparatus 10 is powered by means of batteries (not shown) that are contained within the housing 14. As noted, the temperature probe 18 is tethered to the housing 14 by means of the flexible cord 22 and is retained within a chamber 44 which is releasably attached thereto. The chamber 44 includes a receiving cavity and provides a fluid-tight seal with respect to the remainder of the interior of the housing 14 and is separately described in copending and commonly assigned U.S. Ser. Nos. 10/268,844 and 10/379,276, the entire contents of which are herein incorporated by reference.

Figure 2:
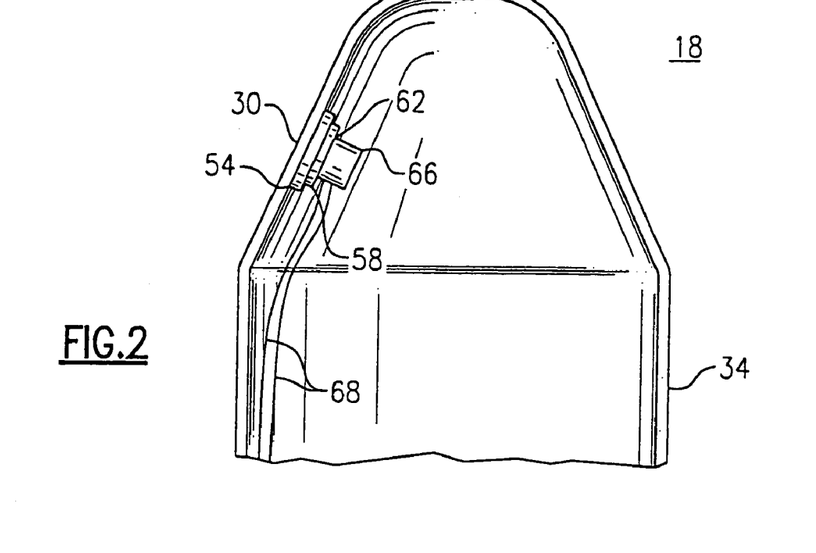
FIG. 2 is a partial sectioned view of the interior of a temperature probe of the temperature measuring apparatus of FIG. 1.

Turning to FIG. 2, the temperature probe 18 is defined by an elongate casing 30 that includes at least one temperature responsive element disposed within a distal tip portion 34 thereof, the probe being sized to fit within a patient body site (e.g., sublingual pocket, rectum, etc.,).

The manufacture of the temperature measuring portion of the herein described temperature probe 18 includes several layers of different materials. The disposition and amount of these materials significantly influences temperature rise times from probe to probe and needs to be taken into greater account, as is described below. Still referring to the exemplary probe shown in FIG. 2, these layers include (as looked from the exterior of the probe 18) an outer casing layer 30, typically made from a stainless steel, an adhesive bonding epoxy layer 54, a sleeve layer 58 usually made from a polyimide or other similar material, a thermistor bonding epoxy layer 62 for applying the thermistor to the sleeve layer, and a thermistor 66 that serves as the temperature responsive element and is disposed in the distal tip portion 34 of the thermometry probe 18. As noted above and in probe manufacture, each of the above layers will vary significantly (as the components themselves are relatively small). In addition, the orientation of the thermistor 66 and its own inherent construction (e.g., wire leads, solder pads, solder, etc.) will also vary from probe to probe. The wire leads 68 extending from the thermistor 66 extend from the distal tip portion 34 of the probe 18 to the flexible electrical cord 22 in a manner commonly known in the field.

Figure 6:
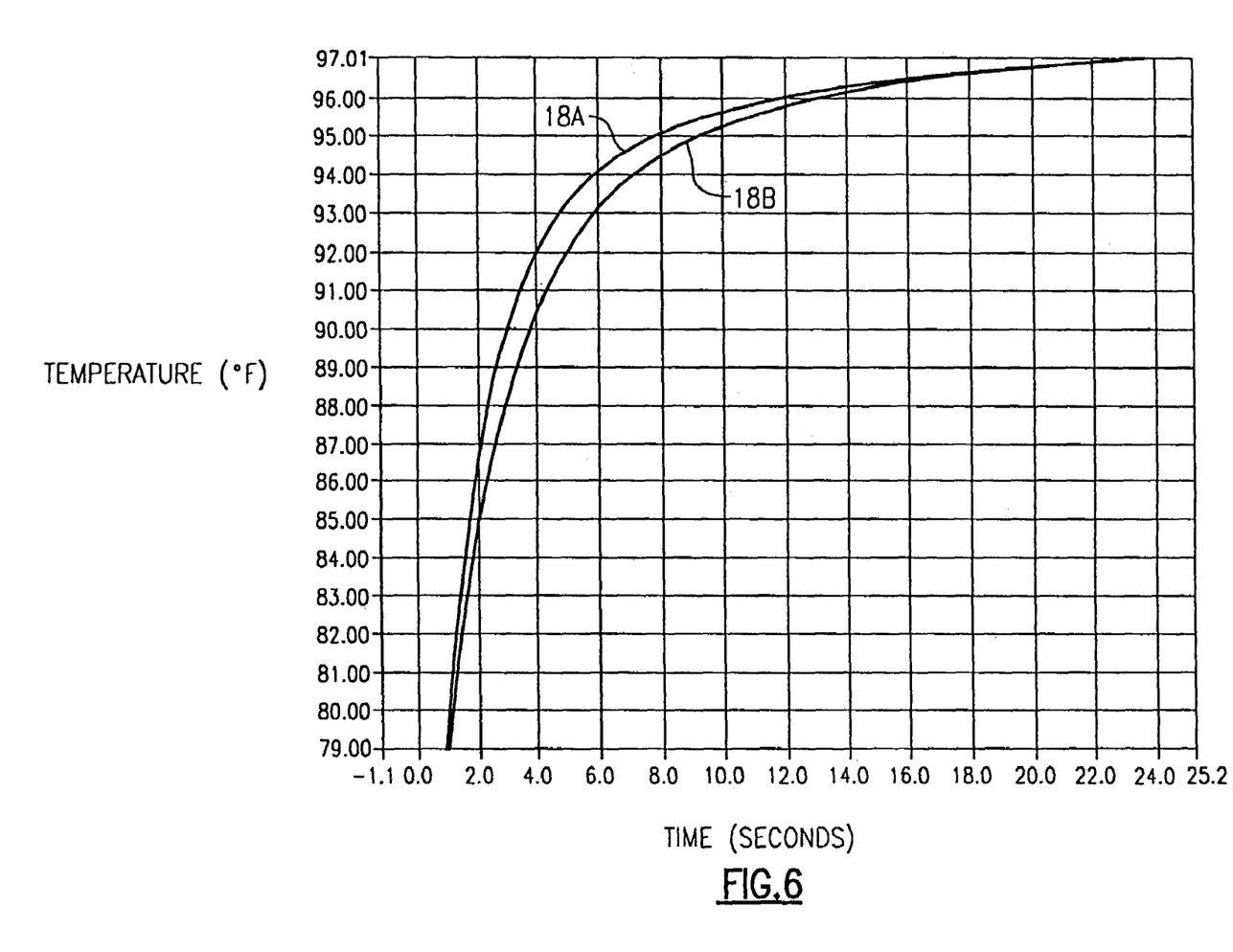
FIG. 6 is a graphical representation comparing the thermal rise times of two temperature probes.

A first demonstration of these differences is provided by the following test performed on a pair of temperature probes 18A, 18B, the probes having elements as described above with regard to FIG. 2. These probes were tested and compared using a so-called "dunk" test. Each of the probes 18A, 18B were tested using the same disposable probe cover (not shown). In this particular test, each temperature probe is initially lowered into a large tank (not shown) containing a fluid (e.g., water) having a predetermined temperature and humidity. In this instance, the water had a temperature and humidity comparable to that of a suitable body site (ie., 98.6 degrees Fahrenheit and 100% relative humidity). Each of the probes 18A, 18B were separately retained within a supporting fixture (not shown) and lowered into the tank. A reference probe (not shown) monitored the temperature of the tank which was sufficiently large so as not to be significantly effected by the temperature effects of the probe. As is apparent from the graphical representation of time versus temperature for each of the probes 18A, 18B compared in FIG. 6, each of the temperature probes 18A, 18B ultimately reaches the same equilibrium temperature; however, each probe takes a differing path. It should be pointed out that other suitable tests, other than the "dunk" test described herein, can be performed to demonstrate the effect graphically shown according to FIG. 6.

With the previous explanation serving as a need for the present invention, it would be preferred to be able to store characteristic data relating to each temperature probe, such as data relating to transient rise time, in order to normalize the manufacturing effects that occur between individual probes. As previously shown in FIG. 1, one end of the flexible electrical cord 22 is attached directly to a temperature probe 18, the cord including contacts for receiving signals from the contained thermistor 66 from the leads 68.

Figure 3:
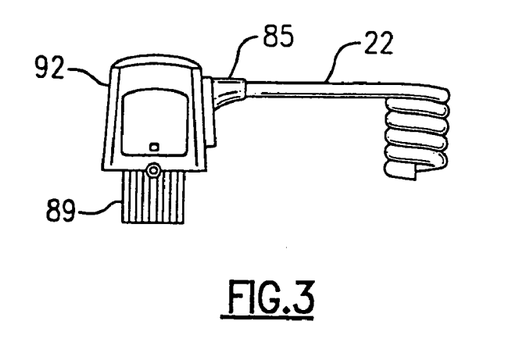
FIG. 3 is an enlarged view of a connector assembly for the temperature probe of FIGS. 1 and 2, including an EEPROM used for storing certain thermal probe related data.
Figure 4:
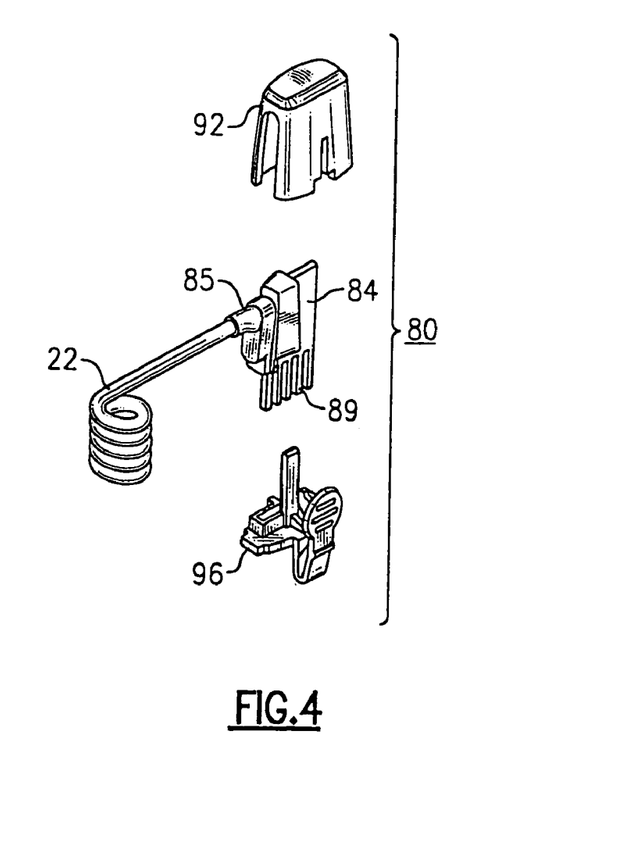
FIGS. 4 and 5 are exploded views of the probe connector of FIG. 3.
Figure 5:
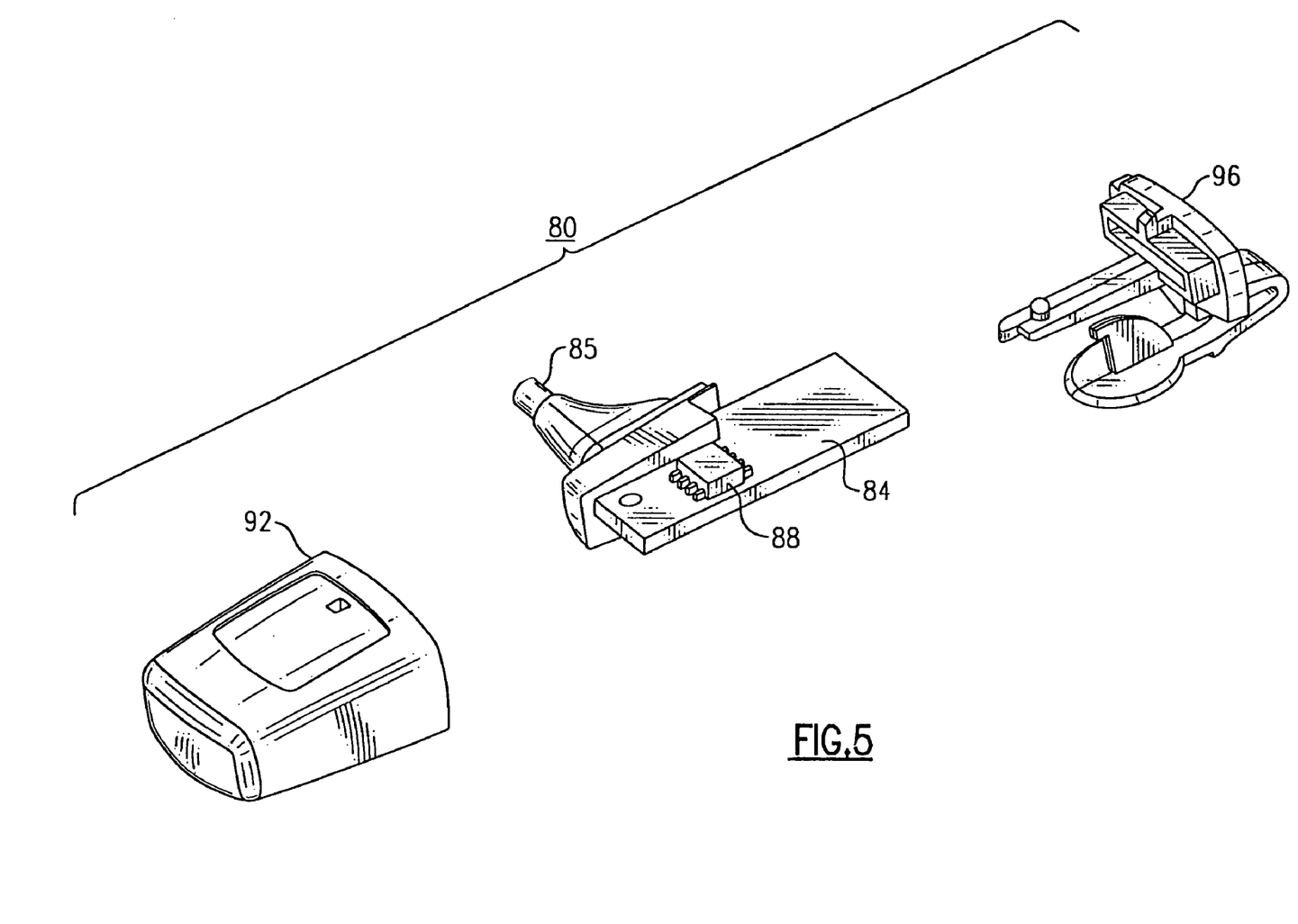

Referring to FIGS. 3-5, a construction is shown for the opposite or device connection end of the flexible electrical cord 22 in accordance with the present invention. This end of the flexible electrical cord 22 is attached to a connector 80 that includes an overmolded cable assembly 82 including a ferrule 85 for receiving the cable end as well as a printed circuit board 84 having an EEPROM 88 attached thereto. The connector 80 further includes a cover 92 which is snap-fitted over a frame 96, which is in turn snap-fitted onto the cable assembly 82. As such, the body of the EEPROM 88 is shielded from the user while the programmable leads 89 extend from the edge and therefore become accessible for programming and via the housing 14 for input to the processing circuitry when a probe 18 is attached thereto. The frame 96 includes a detent mechanism, which is commonly known in the field and requires no further discussion, to permit releasable attachment with an appropriate mating socket (not shown) on the housing 14 and to initiate electrical contact therewith.

During assembly/manufacture of the temperature probe 18 and following the derivation of the above characteristic data, stored values, such as those relating to transient rise time, are added to the memory of the EEPROM 88 prior to assembly into the probe connector 80 through access to the leads extending from the cover 92. These values can then be accessed by the housing processing circuitry when the connector 80 is attached to the housing 14.

Figure 8:
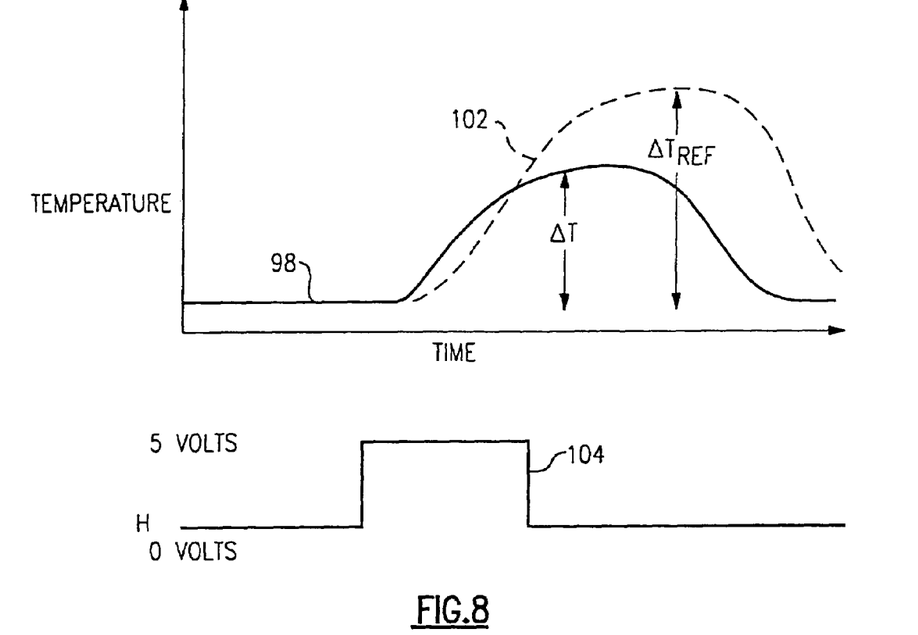
FIG. 8 is a graphical representation of an additional technique for normalizing the preheat time of a temperature probe.

In terms of this characteristic data and referring to FIG. 8, the probe heater gain, representing the efficiency of the probe pre-heating circuit can be deduced, and stored for an individual probe. This value can be derived by retaining the probe in a test fixture (not shown) and then applying a fixed amount of electrical energy to the heater element as shown by curve 104. The amount of heat that results can then be measured, as shown by the temperature rise $\Delta T$ to the peak of the resulting temperature versus time curve 98. This temperature rise is then compared to a nominal probe's similar heating characteristic, indicated as $\Delta Tref$ on a curve 102, shown in phantom, and a ratio of $\Delta T$ and $\Delta Tref$ between the two temperature rises is calculated. This probe-specific ratio is then stored in the EEPROM 88 and is used by the stored heater control algorithm in order to pre-heat the probe tip. Knowing the above ratio for an individual probe permits the heater control algorithm to come up to the pre-heat temperature more rapidly and consistently from probe to probe.

Figure 7:
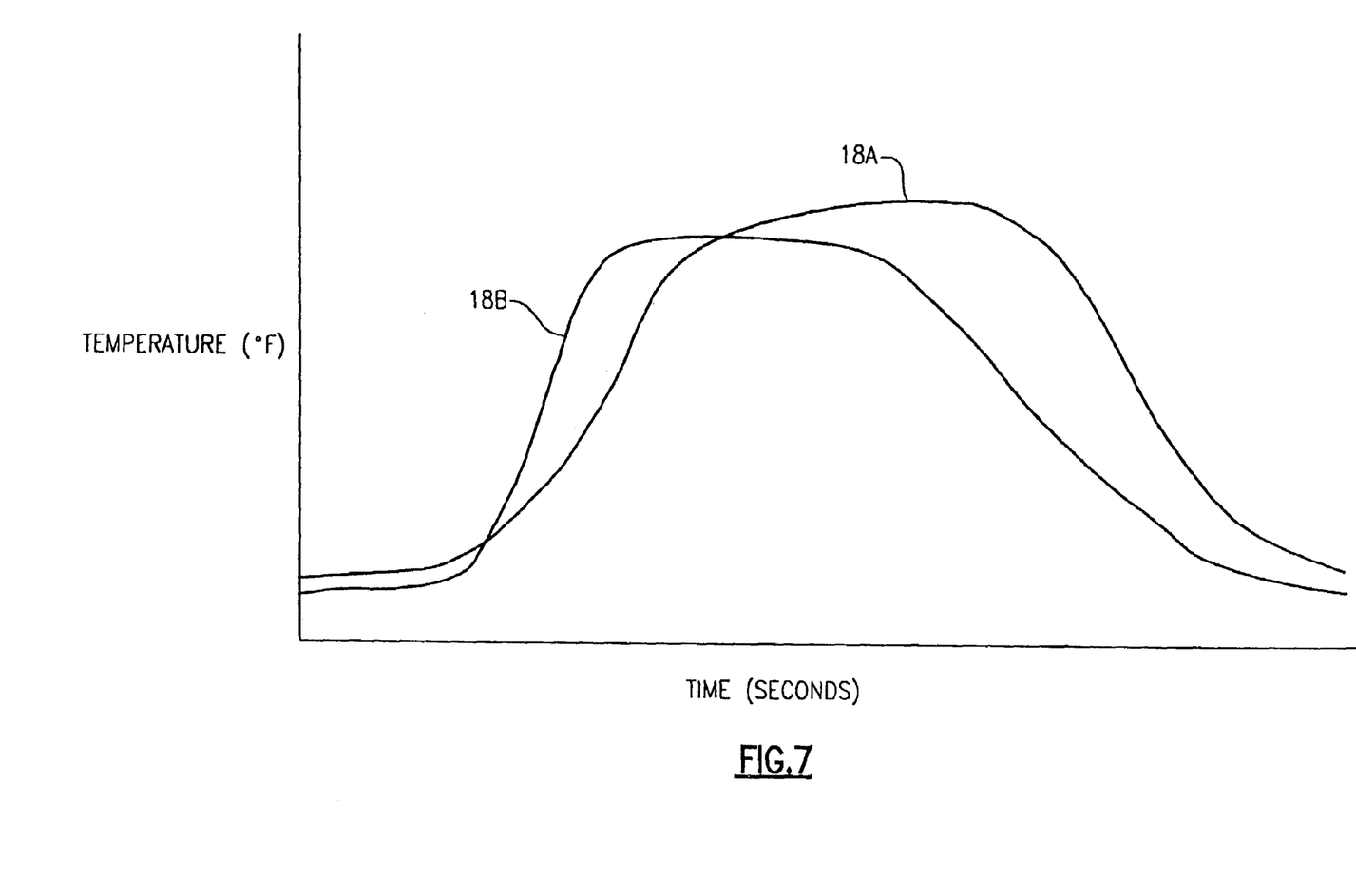
FIG. 7 is a graphical representation comparing the preheating characteristics of two temperature probes.

Additional data can be stored onto the EEPROM 88. Referring to FIG. 7, a further demonstration is made of differing characteristics between a pair of temperature probes 18A, 18B. In this instance, the heating elements of the probes are provided with a suitable voltage pulse and the temperature rise is plotted versus time. The preheating efficiency of each probe 18A, 18B can then be calculated by referring either to the raw height of the plotted curve or alternately by determining the area under the curve. In either instance, the above described variations in probe manufacturing can significantly affect the preheating character of the probe 18A, 18B and this characteristic data can be utilized for storage in the EEPROM 88.

As noted above and in either of the above described instances, one of the probes 18A, 18B being compared can be an ideal or so-called "nominal" thermometry probe having an established profiles for the tests (transient heat rise, preheating or other characteristic) being performed. The remaining probe 18B, 18A is tested as described above and the graphical data between the test and the nominal probe is compared. The differences in this comparison provides an adjustment(s) which is probe-specific for a polynomial(s) used by the processing circuitry of the apparatus 10. It is these adjusted coefficients which can then be stored into the programmable memory of the EEPROM 88 via the leads 89 to normalize the use of the probes with the apparatus.

Figure 9:
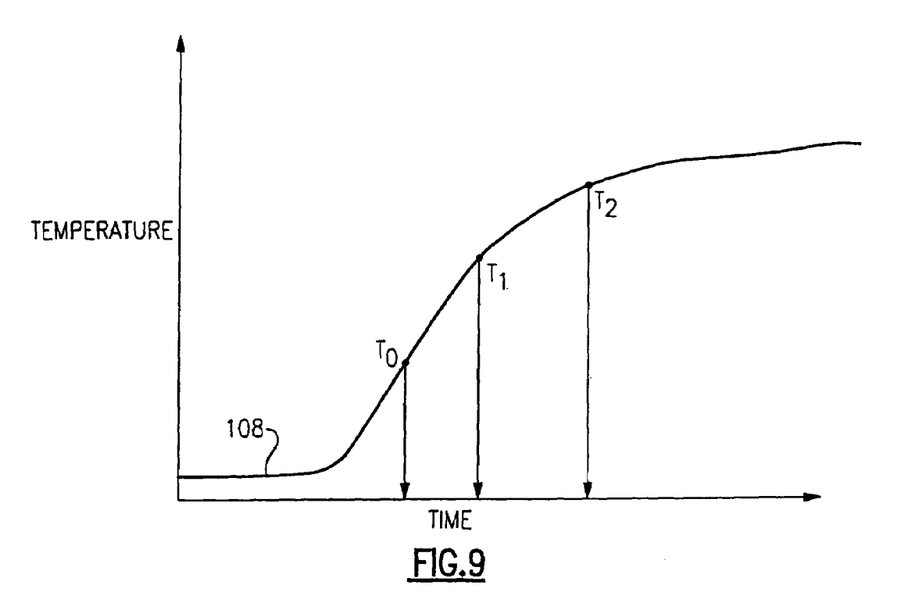
FIG. 9 is a graphical representation illustrating an additional technique relating to the dynamic heat rise characteristics of a temperature probe.

Referring to FIG. 9, an alternative method of using dynamic rise time characteristics of a probe 18 is depicted. First, the probe tip temperature is preferably forced to an initial value, such as, for example, by placing the probe tip relative to a calibrated air flow in order to precondition the probe tip relative to the ambient environment. The probe is then plunged into a "dunk-like" fixture (not shown), as is described above at a known rate wherein the temperature rise in the tip is noted. Beginning at a predetermined starting temperature, $T_0$, (approximately 93 degrees Fahrenheit) the rate of temperature rise $T_1$, $T_2$ is recorded at two specific time intervals along the temperature rise curve 108, respectively. In this instance, 0.5 and 1.5 seconds are the time intervals utilized. These temperature values are stored in the probe's EEPROM 88 and utilized by the predict algorithm of the thermometry apparatus to provide a more accurate temperature.

For example and for illustrative purposes, an exemplary predict algorithm may be represented as follows:

$$(P \times F_1) + F_2 - (((T_1 + T_2) \times F_3) - F_4)$$

in which each of $F_1$ $F_2$ $F_3$ and $F_4$ are predetermined numerical coefficients; P is the probe tip temperature; $T_1$ is the 0.5 temperature response; and $T_2$ is the 1.5 second temperature response.

Parts List for FIGS. 1-9
10 temperature measuring apparatus
14 housing
18 temperature probe
18A temperature probe
18B temperature probe
22 flexible cord
30 casing
34 distal tip portion
35 display
38 actuable buttons
44 chamber
54 bonding epoxy layer
58 sleeve layer
62 thermistor bonding epoxy layer
66 thermistor
68 leads
80 connector
82 cable assembly
84 printed circuit board
85 ferrule
88 EEPROM
89 leads
92 cover
96 frame
98 temperature vs time curve
102 curve
104 curve
108 curve

We claim:

1. A method for calibrating a temperature probe for a thermometry apparatus, said method comprising the steps of:
    characterizing the transient heat rise behavior of a temperature probe used with said apparatus;
    comparing the characterized transient heat behavior of a said temperature probe to that of a nominal temperature probe and normalizing said characterized transient heat rise behavior based on said comparing step;
    storing the normalized transient heat rise behavior on an EEPROM associated with said probe; and
    applying the stored normalized transient heat rise behavior to an algorithm for predicting a final steady state temperature for said probe wherein said characterizing step includes the steps of applying a voltage pulse to said probe and plotting temperature rise versus time and in which said comparing and normalizing step includes the step of comparing the plotted temperature rise curve of said probe to a temperature rise curve for a nominal probe at specified time intervals to determine normalizing coefficients for storing in said EEPROM for applying to said predict algorithm.

2. A method for calibrating a temperature probe for a thermometry apparatus, said method comprising the steps of:
    forcing the probe to an initial temperature value;
    placing the probe in a test fixture that promotes temperature rise of said probe from said initial temperature value at a known rate;
    plotting the temperature rise of said probe versus time;
    determining coefficients of said probe from said plotted temperature rise versus time data for storing on a EEPROM of said thermometry apparatus; and
    applying said coefficients to an algorithm for predicting temperature.

3. The method of claim 2, wherein said placing step includes the step of placing said probe in a dunk test.

4. The method of claim 2, wherein said predict algorithm is $(P \times F_1) + F_2 - (((T_1 + T_2) \times F_3) - F_4)$ wherein each of $F_1$ $F_2$ $F_3$ and F4 are predetermined numerical coefficients, P is the probe temperature, $T_1$ is the temperature response of said plotted temperature rise of said probe at a first time interval and $T_2$ is the temperature response of said plotted temperature rise of said probe at a second time interval.

* * * * *